United States Patent [19]

Barnard et al.

[11] 4,405,551

[45] Sep. 20, 1983

[54] PROCESS FOR PROVIDING COLOR CONTRAST ON SURFACE OF MOULDED ARTICLE

[75] Inventors: John Barnard, Letchworth; Barry D. Bloombaum, Luton, both of England

[73] Assignee: Imperial Chemical Industries PLC, London, England

[21] Appl. No.: 356,745

[22] Filed: Mar. 10, 1982

[30] Foreign Application Priority Data

Mar. 20, 1981 [GB] United Kingdom ............... 8108775

[51] Int. Cl.$^3$ ........................ B29C 5/08; B29C 9/00; B29D 9/00

[52] U.S. Cl. ................................. 264/245; 264/255

[58] Field of Search ............. 264/245, 246, 247, 255, 264/73, 250

[56] References Cited

U.S. PATENT DOCUMENTS

| | | | |
|---|---|---|---|
| 2,615,271 | 10/1952 | Ulmer et al. | 264/73 |
| 3,463,697 | 8/1969 | Findlay et al. | 264/245 |
| 3,504,063 | 3/1970 | Lemelson | 264/245 |
| 3,607,997 | 9/1971 | Linturn | 264/245 |
| 3,660,547 | 5/1972 | Ruekberg | 264/245 |
| 3,949,044 | 4/1976 | Varini | 264/245 |
| 4,252,962 | 2/1981 | Stevenson | 264/245 |
| 4,364,880 | 12/1982 | Howse | 264/245 |

FOREIGN PATENT DOCUMENTS

| | | | |
|---|---|---|---|
| 55-28852 | 2/1980 | Japan | 264/245 |
| 56-9261 | 1/1981 | Japan | 264/73 |
| 523984 | 7/1940 | United Kingdom | 264/245 |

*Primary Examiner*—Willard E. Hoag
*Attorney, Agent, or Firm*—Cushman, Darby & Cushman

[57] ABSTRACT

A method of moulding a shaped article from a curable composition in which the composition is cured in a mould comprising at least two mould parts defining a cavity characterized in that prior to introducing the curable composition into the mould cavity, at least part of the surface forming the mould cavity is provided with a deposit of a material which provides a color contrast with the curable composition, the deposit being provided on areas of the mould which correspond to the areas on the cured moulding on which the color contrast is required to be reproduced, the deposit consisting of at least one finely divided pigment mixed with at least one finely divided filler. Preferably the weight ratio of filler to pigment is in the range 1:1 to 100:1, desirably 5:1 to 50:1. Sufficient deposit is applied to give the desired color contrast effect in the finished moulding.

5 Claims, No Drawings

PROCESS FOR PROVIDING COLOR CONTRAST ON SURFACE OF MOULDED ARTICLE

This invention relates to a process of moulding shaped articles from curable resin compositions.

Curable compositions suitable for forming moulded articles are well known. For reasons of cost and performance in service these compositions normally contain substantial amounts of filler. Typical compositions are described, for example, in British patent specification No. 1 493 393. This specification discloses low viscosity compositions containing at least 20% by volume of finely divided fillers in a state of stably deflocculated dispersion in a polymerisable liquid. A polymeric dispersant is used to obtain the stably deflocculated dispersion. The compositions described are suitable for moulding shaped articles in a process in which the low viscosity dispersion is introduced into a mould and cured under the influence of heat and/or a catalyst to give a shaped article which replicates the shape of the mould. In most of the curable systems described a volume shrinkage occurs as the composition is cured so that it is necessary to make provision for the surfaces of the mould to maintain contact with the composition as it changes from the fluid to the cured stated.

Using known moulding techniques it is possible to produce articles having a very high quality surface finish from these compositions, particularly when the polymerisable liquid is a material such as methyl methacrylate. These compositions have found use for shaped articles such as articles of sanitaryware, including wash basins, vanitory unit tops, shower trays and table tops. The attractive surface finish of shaped articles may be further enhanced by providing colour contrasts in the surface of the article. An inexpensive, but effective, method of providing a shaped article with a patterned, shaded or otherwise colour contrasted surface has now been devised.

Accordingly there is provided a method of moulding a shaped article from a curable composition in which the composition is cured in a mould comprising at least two mould parts defining a cavity characterised in that prior to introducing the curable composition into the mould cavity, at least part of the surface forming the mould cavity is provided with a deposit of a material which provides a colour contrast with the curable composition, the deposit being provided on areas of the mould which correspond to the areas on the cured moulding on which the colour contrast is required to be reproduced, the deposit consisting of at least one finely divided pigment mixed with at least one finely divided filler. Preferably the weight ratio of filler to pigment is in the range 1:1 to 100:1, desirably 5:1 to 50:1. Sufficient deposit is applied to give the desired colour contrast effect in the finished moulding.

It is preferred that the deposit should contain a finely divided filler which does not have a strong pigmenting effect, so that the colouring of the contrast regions may be more readily controlled.

In a preferred process the colour contrast deposit is provided on the mould surfaces by using a suspension of the pigment and filler in a liquid carrier which is readily volatile at the temperature at which the mould is maintained during the mould filling process. Preferably, the moulds will be maintain at an elevated temperature, for example at about 50° C. or above, in preparation for the curing process, so that when the pigment/filler mixture in the volatile liquid carrier is applied to the required areas of the mould the carrier is rapidly volatilised leaving a thin layer of pigment/filler mixture on the mould surface.

In a preferred composition for providing the deposit the filler used is the same as that used in the curable compositions. Typical fillers are described in the aforementioned British patent specification No. 1 493 393 and include aluminas, forms of silica such as quartz, cristobalite and tridymite, calcined and uncalcined kaolins and feldspar. Preferably the average particle size of the filler used is less than 10 microns. For ease of operation it may be desirable to include a surface active material which reduces the risk of flocculation of the pigment or filler in the dispersion.

Surprisingly, the use of the process of the invention enables the colour contrast areas to be located substantially exactly where required on the moulding with little risk of the deposit flowing or otherwise moving when the curable composition is injected into the mould, particularly if care is taken to ensure that the injection points into the mould for the curable composition do not direct the flow of the composition directly onto the colour contrast deposits. Flow or movement of a deposit has been found to be a very significant problem with other methods of providing colour contrast zones on the moulding. An even more significant advantage of the present invention is the fact that the deposit remains substantially in position during the curing process. This again contrasts with other systems evaluated which are subject to noticeable streaking or movement of the deposit during the curing process, even though the problem of not disturbing the deposit during the filling process has been overcome. The difficulty of overcoming the problem of streaking during curing is believed to result from the forces generated through shrinkage of the composition during curing.

The process of the invention results in attractive colour contrast areas in the surface of the moulding which are totally embedded in the surface so that these surface areas can have the excellent physical attributes of the filler used. Thus the scratch resistance of such colour contrast areas can be maintained as high as the remaining surfaces areas of the article if an appropriate filler is used.

The invention is further illustrated by the following examples.

COMPARATIVE EXAMPLE A

A polymerisation cell was prepared from a pair of flat glass plates (150 mm×150 mm) separated by a 6 mm thick gasket. A variety of colour contrast surfaces were evaluated by painting the inner face of one of the glass plates forming the mould over an area of 50 mm×50 mm with the properitary paints and materials listed in the table below, after heating the glass plate to a temperature of 50° C. The heat in the plate was sufficient to volatilise the liquid carrier. A curable composition, as described in Example 5 of British patent specification No. 1 493 393 containing 50% by volume of filler was poured into the cavity formed by the plates and cured at a temperature of 65° C. for 40 minutes. The accuracy of reproduction of the paint deposits and the quality of surface of the moulding was noted and recorded in Table 1 below:

TABLE 1

| Run | Paint or other contrast material | Observation |
|---|---|---|
| A | Autocolour 2K Carmine (an acrylic resin in a hydrocarbon carrier supplied by Imperial Chemical Industries Limited). | The paint was transferred from the glass surface to the moulding, but the area was no longer clearly defined. |
| B | As above using proprietary isocyanate hardener. | No improvement over A was observed. |
| C | Dulux Vinyl Matt Yellow (a pigmented poly(vinyl acetate) copolymer emulsion paint). | The paint was transferred into the moulding but the area was no longer defined clearly and was badly rippled. |
| D | Valentine Faun Brown (a cellulose-based car paint) | The paint was transferred into the moulding but the area was no longer defined clearly. |
| E | 3% by weight of pigments based on iron oxides dispersed in dibutyl phthalate. | The paint was transferred into the moulding but the area was no longer defined clearly. |
| F | Pigment as in E dispersed in methyl methacrylate. | The paint was transferred into the moulding but the area was no longer defined clearly. |

EXAMPLE 1

The procedure used in Comparative Example A was repeated using a composition containing 30% by weight fine silica, 3% by weight of pigments based on iron oxides, 67% by weight of methyl methacrylate.

In contrast to the experiments of Comparative Example A the painted area was transferred clearly into the moulding as a well defined square without change in its area. The general appearance of the contrasted area was identical to the remainder of the moulding except in that it exhibited an attractive colour contrast.

EXAMPLE 2

The procedure of Comparative Example A was repeated using a nickel surfaced, wash basin mould in place of the glass plate mould. That part of the mould forming the rim of the wash basin was sprayed with a composition containing 40 parts by weight silica, 3 parts by weight of pigments based on iron oxides and 57 parts by weight of methyl methacrylate whilst the mould surface was at a temperature of about 80° C. A dry deposit was left on the mould surface. The mould was then filled with a curable composition similar to that used in Comparative Example A containing 0.5% by weight of pigments based on iron oxides. After polymerisation the sprayed deposit was found to have been transferred precisely into the moulding surface to provide an attractive colour contrast effect. The wear properties of the colour contrast area were essentially the same as the remainder of the moulding.

COMPARATIVE EXAMPLE B

The procesure of Example 2 was repeated using the compositions listed in Table 2 below:

TABLE 2

| Composition | Observation |
|---|---|
| 3% by weight of pigments based on iron oxides in 97% by weight methyl methacrylate. | The applied deposit was transferred into the moulding but no longer retained the pattern in which it had been applied to the mould. |
| Composition used in Example was coated with an acrylic resin lacquer and an isocyanate hardener. | The transferred deposit had the appearance of crocodile skin. |

EXAMPLE 3

The procedure of Comparative Example A was repeated using the compositions listed in Table 3 below. Run A corresponds to Run D in Table 1.

TABLE 3

| Run | Paint | Composition | Observation |
|---|---|---|---|
| A | Valentine Faun Brown | A cellulose-based car paint containing pigments. | Paint was transferred into the moulding but the area was no longer defined clearly. |
| B | Valentine Faun Brown + Silica | As A together with 50% by weight of silica having an average particle size of 10 micron. | Paint transferred to moulding on an area which was clearly defined. |

This comparison shows that the filler is an essential ingredient in obtaining a good quality, well defined transferred pattern in the surface of the moulding.

We claim:

1. A method of moulding a shaped article from a curable composition in which the composition is cured in a mould comprising at least two mould parts defining a cavity characterised in that prior to introducing the curable composition into the mould cavity, at least part of the surface forming the mould cavity is provided with a deposit of a material which provides a colour contrast with the curable composition, the deposit being provided on areas of the mould which correspond to the areas on the cured moulding on which the colour contrast is required to be reproduced, the deposit consisting of at least one finely divided pigment mixed with at least one finely divided filler.

2. A method of moulding a shaped article according to claim 1 wherein the weight ratio of filler to pigment is in the range 1:1 to 100:1.

3. A method of moulding a shaped article according to claim 2 wherein the weight ratio of filler to pigment is in the range 5:1 to 50:1.

4. A method of moulding a shaped article according to any one of claims 1 to 3 in which the filler and pigment are present as a suspension in a liquid carrier, the suspension is applied to a mould surface held at an elevated temperature and the liquid carrier is volatilised prior to filling the mould.

5. A method according to claim 4 wherein the mould surface is held at a temperature of at least 50° C.

* * * * *